United States Patent [19]

Hogue

[11] 4,151,575
[45] Apr. 24, 1979

[54] MOTOR PROTECTIVE DEVICE

[76] Inventor: Maurice A. Hogue, 4311 Gordon, Greenville, Tex. 75401

[21] Appl. No.: 774,884

[22] Filed: Mar. 7, 1977

[51] Int. Cl.² ............................................... H02H 7/09
[52] U.S. Cl. ......................................... 361/33; 361/92
[58] Field of Search ...................... 361/30, 33, 59, 90, 361/92, 21, 34, 71, 74, 88; 318/479; 323/49

[56] References Cited

U.S. PATENT DOCUMENTS

| 1,809,827 | 6/1931  | Bower .................................... 361/92 |
| 3,413,535 | 11/1968 | Hubby ................................ 361/30 X |
| 3,711,747 | 1/1973  | Sahara et al. ..................... 323/49 X |
| 4,060,841 | 11/1977 | Allen .................................... 361/33 |

FOREIGN PATENT DOCUMENTS 559546  9/1932  Fed. Rep. of Germany ............. 361/33

*Primary Examiner*—Harry E. Moose, Jr.
*Attorney, Agent, or Firm*—Hubbard, Thurman, Turner, Tucker & Glaser

[57] ABSTRACT

An electrical device is connected to the magnetic starter of an electrical motor to protect the motor windings from a loss of power on one or more input lines of a three phase power source. The device includes two transformers each being connected across two input lines and having one input line in common with each other. The transformer secondaries are each connected in a relay circuit so that a voltage on the secondary of each transformer above a predetermined value will actuate the relay in its respective circuit. The contacts of both relays are connected in series with each other and with the magnetic starter of the electrical motor so as to actuate the magnetic starter when both relays are closed. When the voltage on any of the three input lines drops substantially below a normal operating level, one or both of these relays will open, immediately turning off the magnetic starter and shutting down the motor to prevent damage to the motor windings. The transformer primary windings are connected through a terminal strip to the power source to enable series or parallel connections to accommodate both 240 volt and 480 volt power lines.

7 Claims, 2 Drawing Figures

MOTOR PROTECTIVE DEVICE

BACKGROUND OF THE INVENTION

This invention relates to protective apparatus for three phase electrical devices. More particularly, this invention is concerned with electrical circuitry for protecting three phase motors against a loss of power on one or more input lines.

Multiple phase electrical devices, particularly three phase motors, are in widespread use today in industry. These devices are supplied by power from polyphase electric power sources which are subject to a variety of fluctuations in voltage and current because of power line failures, transients, ground faults, shorts and many other irregularities which affect the operation of the electrical devices and often cause damage to them.

In three phase electrical motors, it is estimated that approximately 90 percent of motor failures are due to conditions caused by power loss on some of the incoming lines from an electric power source. Typically, the power on one phase of a three phase system will fail, referred to as a single phase condition, resulting in excessive currents in the three phase motor and permanently damaging the motor circuitry.

A number of prior art devices have been developed for the purpose of detecting single phase power line failure and shutting down either the incoming polyphase source or the electrical apparatus attached to the source before damage can occur. These devices have generally been unsatisfactory for a number of reasons. Some sensing devices have not been flexible enough to accept substantial variations in voltage or current without disconnecting the system so that manual resetting is required before further power can be used. Moreover, typical prior art devices usually required either several mechanically moving parts or a substantial amount of electrical or electronic circuitry for detection and implementation of the sensing circuitry. Some systems involve the use of potentiometers and voltage meters requiring constant monitoring and adjustment to properly sense the incoming power lines.

Magnetic starters are frequently used in conjunction with three phase motors to enable automatic operation of the motors by remote control or by timing circuitry or other automatic means. Typically, a magnetic starter has one or more heater coils in series with its circuitry which emits substantial thermal energy when passing excessive current so as to open a thermal relay and shut off the motor. This type of heater coil has been found to provide sufficient protection in most cases against overloading of one or more phases of the circuitry. However, the coils provide little or no protection to the motor circuitry against the loss of power on a single incoming power line of a three phase power system. In most cases, the heater coils do not react quickly enough to prevent permanent damage to the motor circuitry before the motor can be turned off. Moreover, most magnetic starters use at most only two heater coils for a three phase motor so that at least one motor phase is especially vulnerable to a single phase condition.

SUMMARY OF THE PRESENT INVENTION

The present invention utilizes a motor protective device having transformers for sensing the incoming voltage of each power line of a three phase source. The sensing device is connected to a magnetic starter on the motor in a manner such that the starter is immediately disconnected when power is lost on any of the three incoming power lines. The system is connected through a secondary transformer which in turn operate two electro-mechanical relays in series with the magnetic starter. The transformer secondaries are especially designed to open the relays at a predetermined value to shut down the magnetic starter.

In accordance with another aspect of the present invention, apparatus is provided for protecting a polyphase electrical device from damage due to a loss of power on one of the input lines to the device. A transformer senses the voltage of each of the input lines and generates a signal representative of the voltage. A relay mechanism is connected to the transformer and has contacts connected in a control circuit for responding to the signal generated by the transformer to close the contacts and complete the control circuit is response to the signal being above a predetermined value and to open the contacts and open the control circuit in response to the signal being below a predetermined value. A control device is provided in series with the contacts in the control circuit for connecting the polyphase electrical device to the input power lines in response to the control circuit being completed.

In accordance with another aspect of the present invention, apparatus is provided for protecting an electrical motor having a magnetic starter and connected to a three phase power source from a loss of power on one or more input lines of the source. A first transformer has a first primary winding connected across first and second input lines. A second transformer has a second primary winding connected across the second input line and a third input line. A first relay has a first coil and a first switch actuable by the first coil, the coil being connected to the secondary winding of the first transformer. A second relay has a second coil connected to the secondary winding of the second transformer and has a second switch actuable by the second coil and connected in series with the first switch of the first relay. The first and second relays are adapted for connection in series with the magnetic starter of the motor to actuate and deactuate the starter.

The present invention offers a number of important advantages over prior art devices. The system effectively senses each incoming power line and shuts off the motor instantaneously if the voltage on any incoming line drops to zero. By using the magnetic starter in conjunction with the protective device, the present invention is especially valuable in unattended uses of industrial equipment such as oil field pumping systems, as well as many other automatic applications where frequent manual adjustments and monitoring is undesirable. Moreover, the present system does not need to be reset, and the magnetic starter is actuated as soon as power again appears on the faulty incoming line. The present invention is useful with either 240 volt or 480 volt input lines which comprise over 75 percent of all three phase installations. Where other input voltages are used, the device of the present invention is easily modified to provide sensing transformers having appropriate connections. The system of the present invention utilizes mostly standard components which are readily accessible for simplicity in manufacture and maintenance of the system.

Other objects, advantages and features of this invention will be apparent to one skilled in the art upon a consideration of the written specification and the appended claims and drawings.

DETAILED DESCRIPTION

Figure 1:
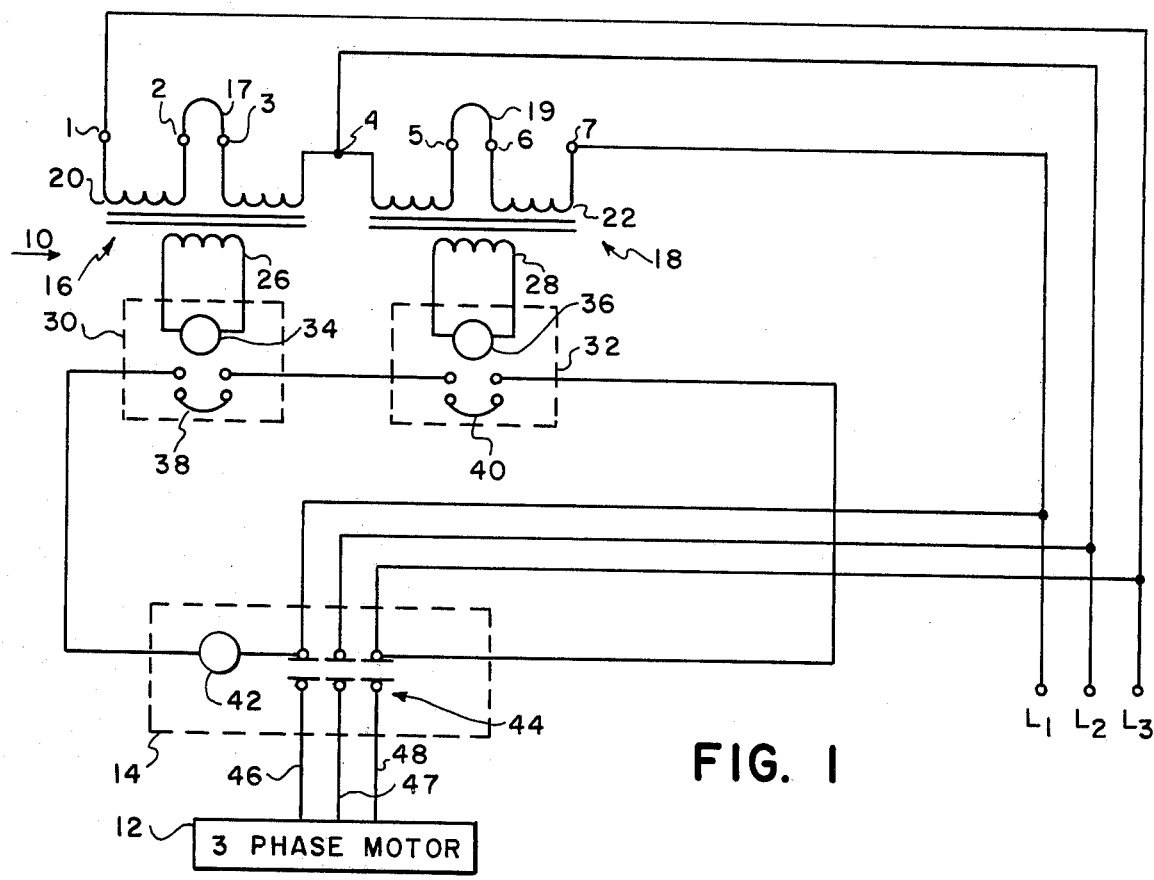
FIG. 1 is a circuit diagram of a motor protective device embodying the present invention.
Figure 2:
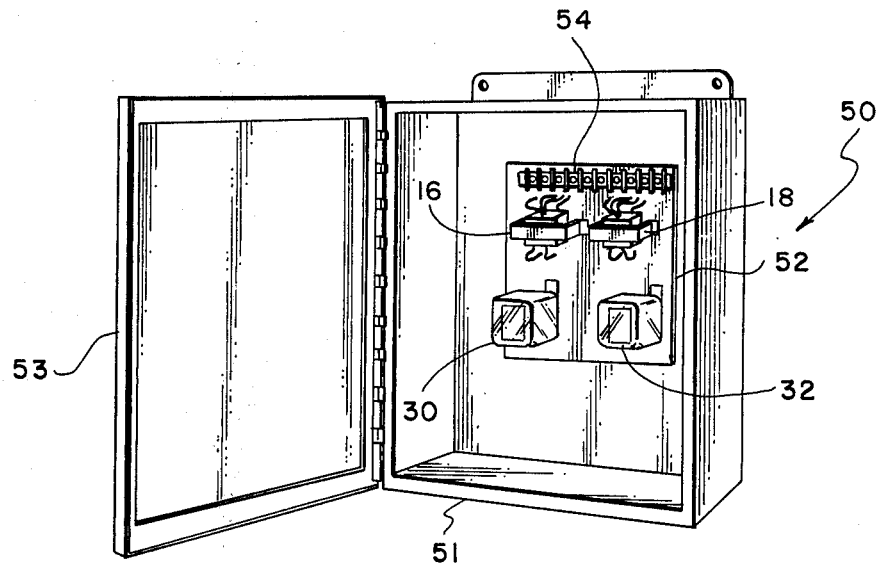
FIG. 2 is a perspective front view of the motor protective device utilizing the circuitry shown in FIG. 1.

Referring to FIGS. 1 and 2, a detailed description of a preferred embodiment of the present invention will be given. FIG. 1 discloses a motor protective circuit 10 for attachment to a three phase motor 12 having a magnetic starter assembly 14. Incoming power lines L1, L2 and L3 are standard three phase power lines typically having a voltage of 240 or 480 volts. The power lines are attached by a delta connection to transformers 16 and 18. Line L1 is connected to one side of primary 22 of transformer 18 and line L3 is connected to one side of primary 20 of transformer 16. The opposite sides of primaries 20 and 22 are connected together with line L2 at a junction 4.

The secondary winding 26 of transformer 16 is connected in series with a standard electrical relay 30 consisting of an electro-magnetic coil 34 operating a movable contact 38. Similarly, the secondary 28 of transformer 18 is in communication with a relay 32 having a coil 36 for operating a movable contact 40. Contacts 38 and 40 are connected in series with each other and attached to opposite junctions of a magnetic starter 14. Within the starter unit, a coil 42 is connected in series with a three-junction contactor 44 having inputs from each lines L1, L2 and L3 and outputs on lines 46, 47 and 48 to motor 12.

Transformers 16 and 18 are especially designed to accommodate incoming power lines of either 240 or 480 volts. A standard terminal strip is used to make the proper electrical connections for the primary sides of transformer 16 and 18 for input voltages of 240 volts or 480 volts in order to obtain the same voltages on secondaries 26 and 28. As shown in FIG. 1, primaries 20 and 22 each have two sections which are connected in series to accommodate a 480 volt line input. Line 3 is connected to terminal 1 of the terminal strip on one side of the primary winding 20. Terminals 2 and 3 at the central dividing point of the two sections of primary winding 20 are connected together by a jumper wire 17. Terminal 4 joins together adjacent sides of primary windings 20 and 22 with incoming line L2. Terminals 5 and 6 at the central dividing point of the two sections of primary 22 are connected by a jumper wire 19. Terminal 7 is connected to the side of primary winding 22 opposite the side common with terminal 4.

When a 240 volt three phase line system is used, the two sections of each of transformer primaries 20 and 22 are connected in parallel rather than in series as is shown. In this case, terminals 1 and 2 are jumpered together and terminals 3, 4 and 5 are commonly connected. Terminals 6 and 7 are likewise jumpered together, and the jumper wires 17 and 19 are disconnected. This connection provides half as many turns on the primary side of transformer 16 and 18 so that the same voltages is induced in the secondary windings 26 and 28 respectively as would be induced with 480 volts in a series connection. The windings on secondaries 26 and 28 are selected to provide approximately 200 volts output to relays 30 and 32 under normal operating conditions.

Referring now to FIG. 2, a perspective view of a motor protective unit 50 utilizing circuitry 10 is shown. The circuitry is mounted on a printed circuit board 52 having the appropriate interconnections on the opposite side of the board. A metal housing 51 having a tight-fitting door 53 provides a protective enclosure for board 52. A conventional terminal strip 54 is mounted at the top of board 52 for enabling easy connection of the circuit with the incoming lines of a three phase power source (not shown). Transformers 16 and 18 have the appropriate primary and secondary windings soldered to the printed circuit board to make the proper connections with the board wiring. Electrical relays 30 and 32 are soldered to the printed circuit board 52 below transformers 16 and 18 to make the connections shown in FIG. 1. The output terminals to the magnetic starter 14 are wired to terminal strip 54 at the top of board 52.

In operation, a 240 volt or 480 volt input is impressed across the primary windings 20 and 22 of transformers 16 and 18. The secondary windings 26 and 28 each induce a voltage of approximately 200 volts to close relays 30 and 32, actuage coil 42 of magnetic starter 14 and enable operation of motor 12. A loss of power on line L3 drops the voltage on transformer 16 to approximately zero resulting in no voltage input to relay 30 so that contact 38 is opened. This action in turn deactuates coil 42 which opens all three contacts of contactor 44 and immediately shuts down motor 12. A similar loss of power on line L1 causes a zero voltage output from transformer 18, likewise opening contact 40 and contactor 44. Should the power fail on line L2, the voltage input to transformers 16 and 18 is cut in half, reducing the voltage output on secondary windings 26 and 28 by half. Relays 30 and 32 are set to open at voltages of approximately 100 volts or less so that both contacts 38 and 40 open. This action deactuates coil 42 and opens contactor 44 shutting down motor 12.

Should one of the incoming lines temporarily fail and later return to full power, circuitry 10 automatically reactuates the magnetic starter 14 to turn on motor 12. Thus, manual resetting of remotely located or inaccessible motors is not necessary. Moreover, should unusually heavy loads be encountered, the normal heater coil arrangement in magnetic starter 14 will provide the necessary protection for motor 12. In the event that unusual power line voltages are encountered other than the standard 240 or 480 volt lines, transformers 16 and 18 can be easily adjusted to accommodate the input voltages and provide the necessary circuitry voltage.

Although a preferred embodiment of the invention has been discussed in detail, it should be understood that various changes, substitutions and alterations can be made therein without departing from the spirit and scope of the invention as defined by the appended claims.

What is claimed is:

1. Apparatus for protecting a three phase electrical motor having a magnetic starter from a loss of power on one or more input lines of a three phase power source supplying said motor comprising:

first and second transformers each having a primary winding with one side connected to one side of the other primary winding and to a first one of the input lines and other side of each primary winding being connected to second and third ones, respectively, of the input lines; and first and second relays connected to the secondary windings of the first and second transformers respectively, each having a coil connected in series to the secondary winding of said first and second transformers respectively, said relays having sufficient sensitivity to deactuate when the voltage of the secondary windings of said first and second transformers is each half or less of its normal operating voltage;

the coils of said first and second relays actuating first and second switches respectively, said first and second switches being connected together in series with each other and with the magnetic starter.

2. Apparatus for protecting an electrical motor having a magnetic starter and connected to a three phase power source from a loss of power on one or more input lines of said source, comprising:
   a first transformer having a first primary winding connected across first and second input lines;
   a second transformer having a second primary winding connected across said second input line and a third input line;
   a first relay having a first coil and a first switch actuable by the first coil, the first coil being connected to the secondary winding of the first transformer; and
   a second relay having a second coil connected to the secondary winding of the second transformer and having a second switch actuable by the second coil connected in series with the first switch of the first relay;
   said first and second relays being adapted for connection in series with the magnetic starter of the motor to actuate and deactuate the starter.

3. The apparatus of claim 2 wherein said first and second primary windings are each split into two sections for connecting to the three phase power source in series with each other to accommodate a 480 volt power source or in parallel with each other to accommodate a 240 volt source.

4. The apparatus of claim 3 wherein the secondary windings of said first and second transformers respectively are each wired to provide about a 200 volt output signal with the respective primaries of said first and second transformers being wired in series to accommodate a 480 volt power source or in parallel to accommodate a 240 volt power source.

5. The apparatus of claim 2 wherein said first and second relays each have switches oriented to deactuate when the voltage on the secondary windings of said first and second transformers respectively is half or less of the normal operating voltage.

6. Apparatus for protecting an electrical motor connected to a three phase power source from a power loss on one or more input lines of said source, comprising:
   a first transformer having a first primary winding connected across first and second input lines;
   a second transformer having a second primary winding connected across said second input line and a third input line;
   a first relay having a first coil and a first pair of contacts actuable by the first coil, the first coil being connected to the secondary winding of the first transformer;
   a second relay having a second coil connected to the secondary winding of the second transformer and having a second pair of contacts actuable by the second coil connected in series with the first pair of contacts of the first relay; and
   a magnetic starter for a three phase motor having a starter coil connected in series with the first and second pairs of contacts and having a contactor actuable by the starter coil to connect the three phase inputs of the motor to the input lines of the three phase power source.

7. Apparatus for protecting an electrical motor having a magnetic starter and connected to a three phase power source from a loss of power on one or more input lines of said source, comprising:
   a first transformer having a first primary winding connected across first and second input lines;
   a second transformer having a second primary winding connected across said second input line and a third input line;
   said first and second primary windings being each split into two sections for connecting to the three phase power source in series with each other to accommodate a 480 volt power source or in parallel with each other to accommodate a 240 volt source;
   the secondary windings of said first and second transformers being each wired to provide about a 200 volt output signal with the respective primaries of said first and second transformers being wired in series to accommodate a 480 volt power source or in parallel to accommodate a 240 volt power source;
   a first relay having a first coil and a first switch actuable by the first coil, the first coil being connected to the secondary winding of the first tranformer; and
   a second relay having a second coil connected to the secondary winding of the second transformer and having a second switch actuable by the second coil connected in series with the first switch of the first relay;
   said first and second relays being adapted for connection in series with the magnetic starter of the motor to actuate and deactuate the starter;
   said first and second relays each have switches oriented to deactuate when the voltage on the secondary windings of said first and second transformers respectively is half or less of the normal operating voltage.

* * * * *